(12) United States Patent
Resch et al.

(10) Patent No.: US 8,656,138 B2
(45) Date of Patent: Feb. 18, 2014

(54) EFFICIENTLY ACCESSING AN ENCODED DATA SLICE UTILIZING A MEMORY BIN

(75) Inventors: Jason K. Resch, Chicago, IL (US); Siyuan Ma, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 52 days.

(21) Appl. No.: 13/231,375

(22) Filed: Sep. 13, 2011

(65) Prior Publication Data

US 2012/0089809 A1   Apr. 12, 2012

Related U.S. Application Data

(60) Provisional application No. 61/390,368, filed on Oct. 6, 2010.

(51) Int. Cl.
*G06F 12/10* (2006.01)

(52) U.S. Cl.
USPC ..... 711/206; 711/173; 711/114; 711/E12.061

(58) Field of Classification Search
USPC .......................... 711/206, E12.061, 173, 114
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |

(Continued)

FOREIGN PATENT DOCUMENTS

JP      402300935      * 12/1990

OTHER PUBLICATIONS

Shamir; How to Share a Secret; Communications of the ACM; vol. 22, No. 11; Nov. 1979; pp. 612-613.

(Continued)

*Primary Examiner* — Mardochee Chery
(74) *Attorney, Agent, or Firm* — Garlick & Markison; Timothy W. Markison

(57) ABSTRACT

A method begins by a processing module receiving an encoded data slice to store and determining a slice length of the encoded data slice. The method continues with the processing module comparing the slice length to a plurality of bin widths, wherein each of the plurality of bin widths represents a fixed storage width of a plurality of memory bins within each of a plurality of memory containers, wherein a storage unit includes the plurality of memory containers. The method continues with the processing module selecting one of the plurality of memory containers based on the comparing to produce a selected memory container, identifying an available bin of the plurality of bins of the selected memory container, and storing the encoded data slice in the available bin.

14 Claims, 11 Drawing Sheets

(56) References Cited

U.S. PATENT DOCUMENTS

| | | | |
|---|---|---|---|
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,694,191 | B1 | 4/2010 | Bono et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0169391 | A1 | 7/2010 | Baptist et al. |
| 2010/0169415 | A1* | 7/2010 | Leggette et al. |
| 2010/0169500 | A1 | 7/2010 | Quigley et al. |
| 2010/0174872 | A1* | 7/2010 | Baxter et al. ................ 711/147 |
| 2010/0189181 | A1 | 7/2010 | Zheng et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

International Search Report and Written Opinion for Application No. PCT/US11/51624, dated Jan. 31, 2012; 7 pgs.

\* cited by examiner

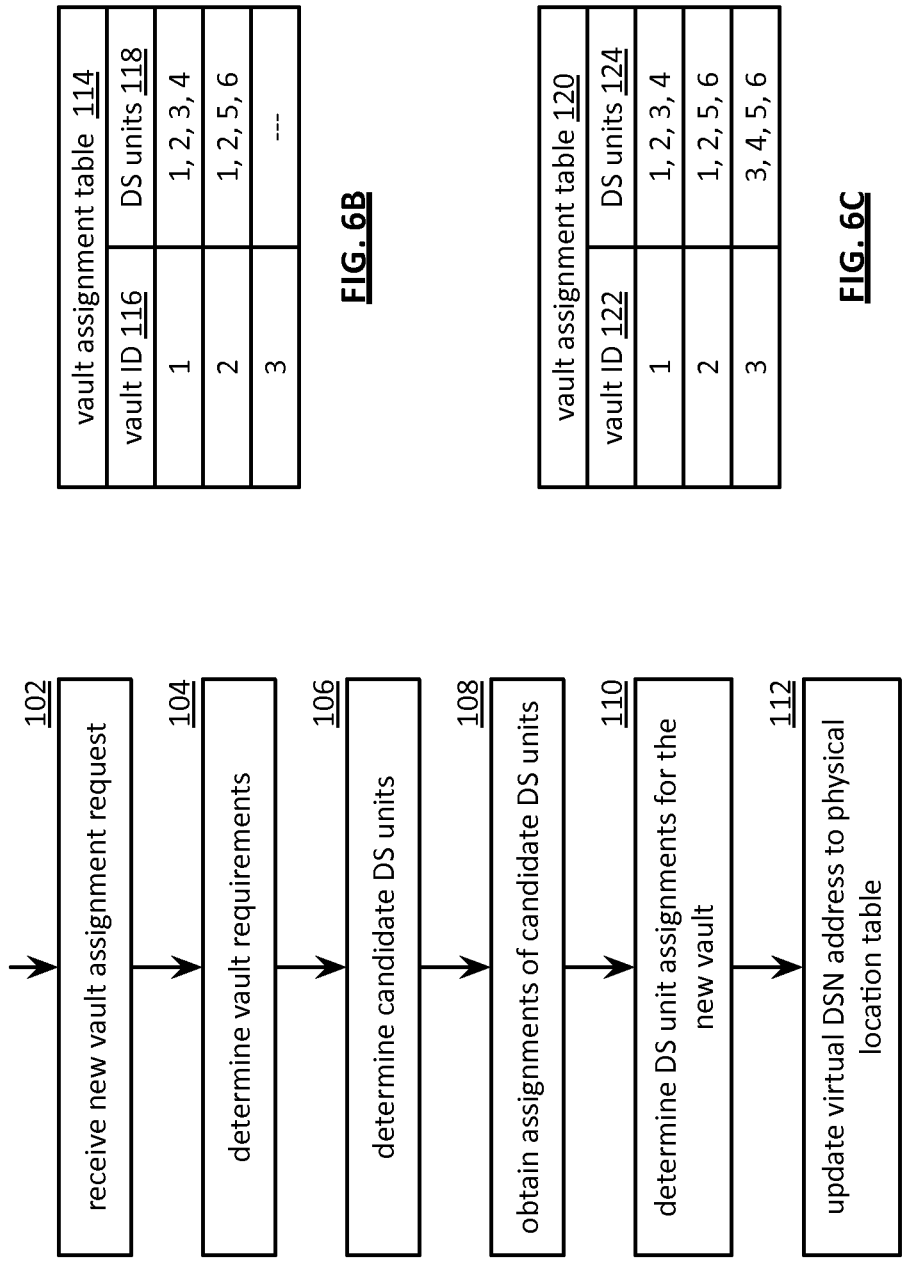

| slice location table 126 | | |
|---|---|---|
| slice name 128 | file ID 130 | file offset 132 |
| 1AB | 400 | 4 |
| 436 | 400 | 2 |
| BC8 | 200 | 1 |
| 457 | 200 | 2 |
| C90 | 400 | 5 |
FIG. 7A
| open location table 134 | |
|---|---|
| file ID 136 | file offset 138 |
| 200 | 0 |
| ••• | ••• |
| 400 | 0 |
| 400 | 1 |
| 400 | 3 |
FIG. 7B
| file 200 140 |
|---|
| offset 0 — open |
| offset 1 — slice BC8 |
| offset 2 — slice 457 / open |
FIG. 7C
| file 400 142 |
|---|
| offset 0 — open |
| offset 1 — open |
| offset 2 — slice 436 / open |
| offset 3 — open |
| offset 4 — slice 1AB |
| offset 5 — slice C90 / open |
FIG. 7D

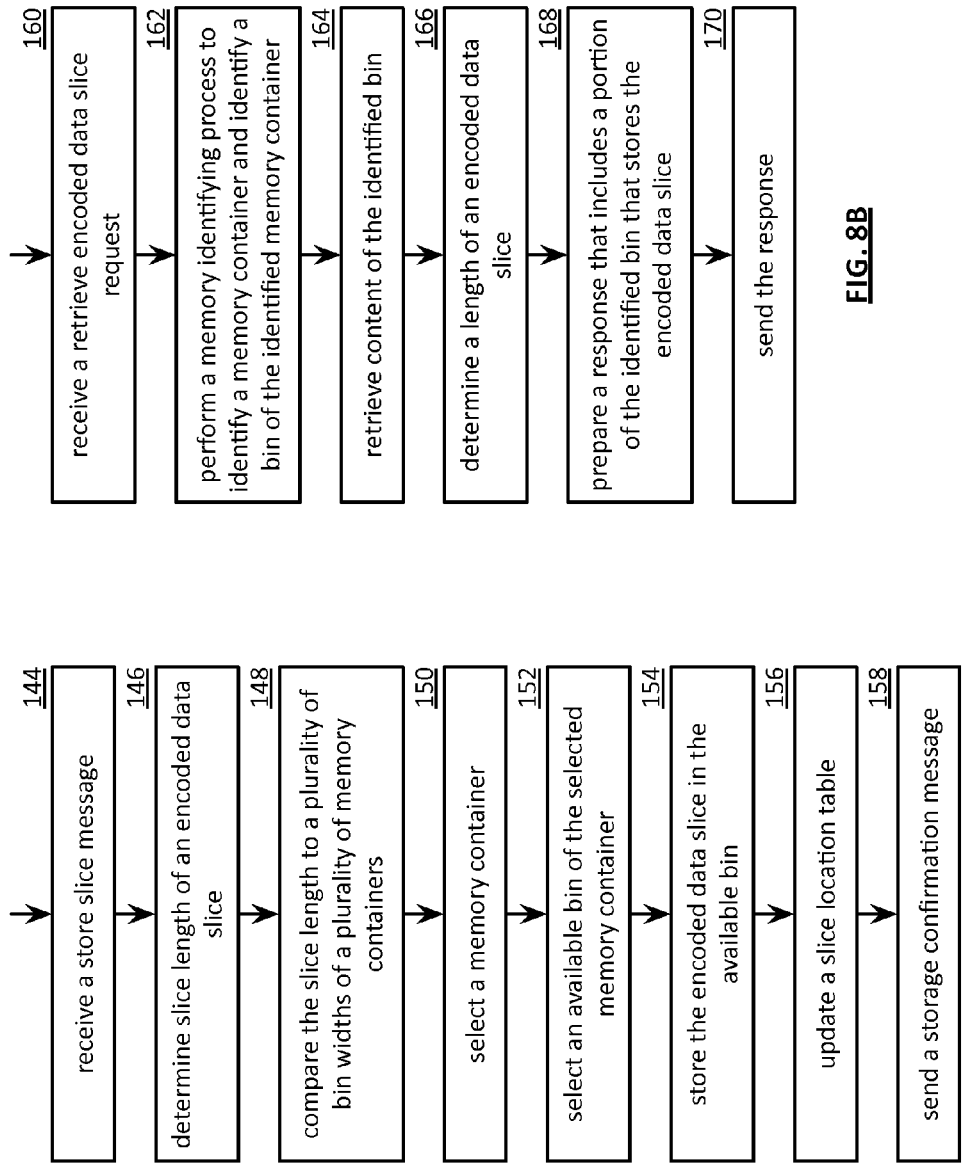

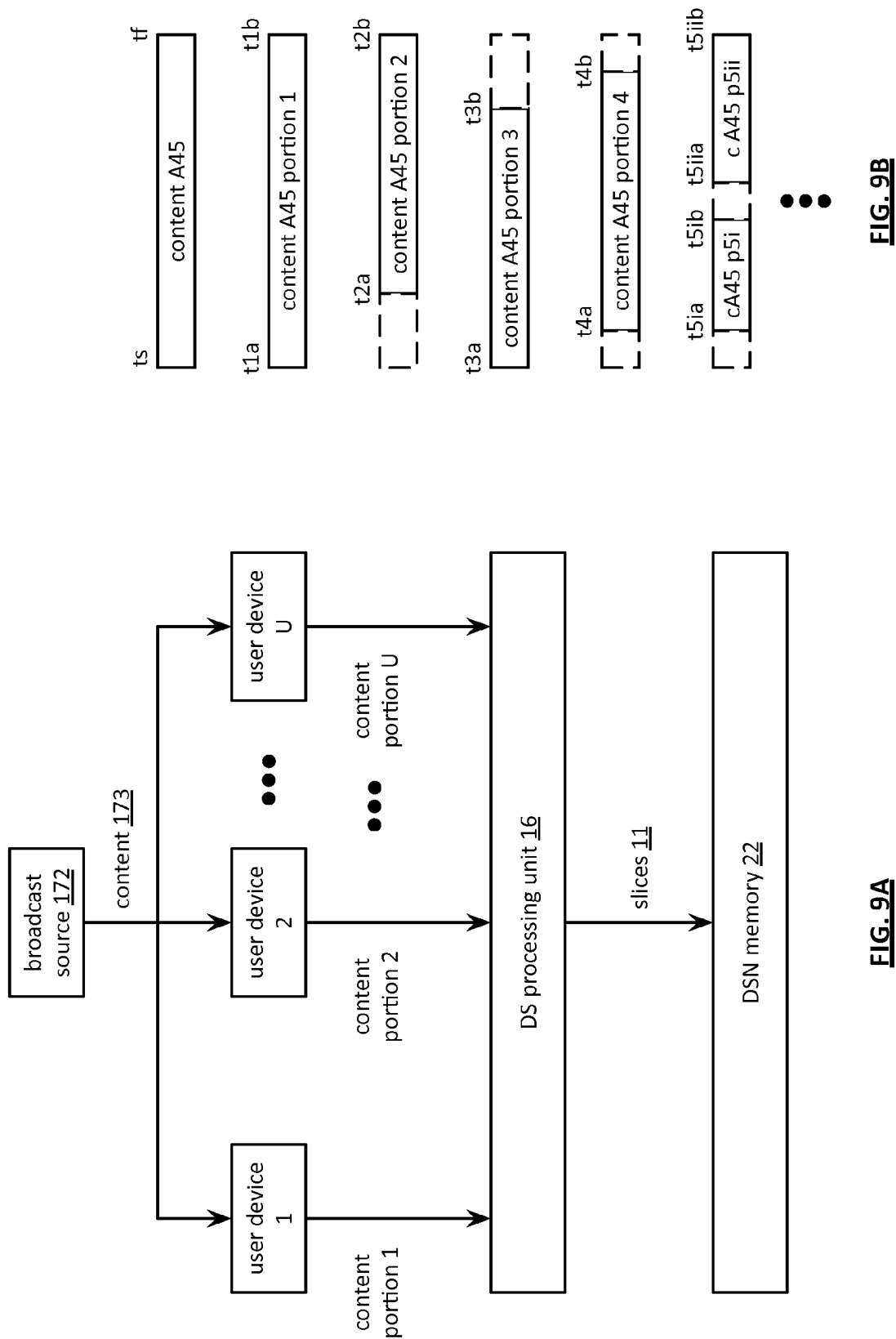

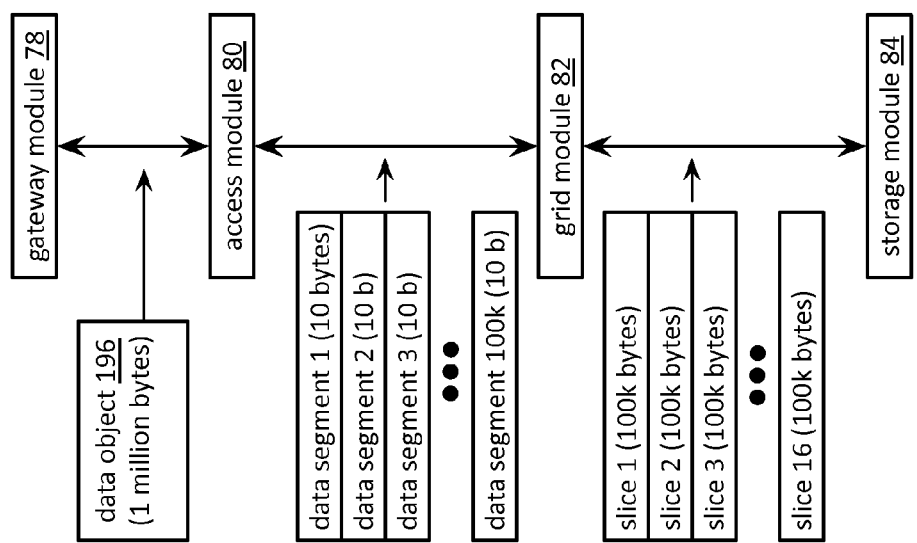

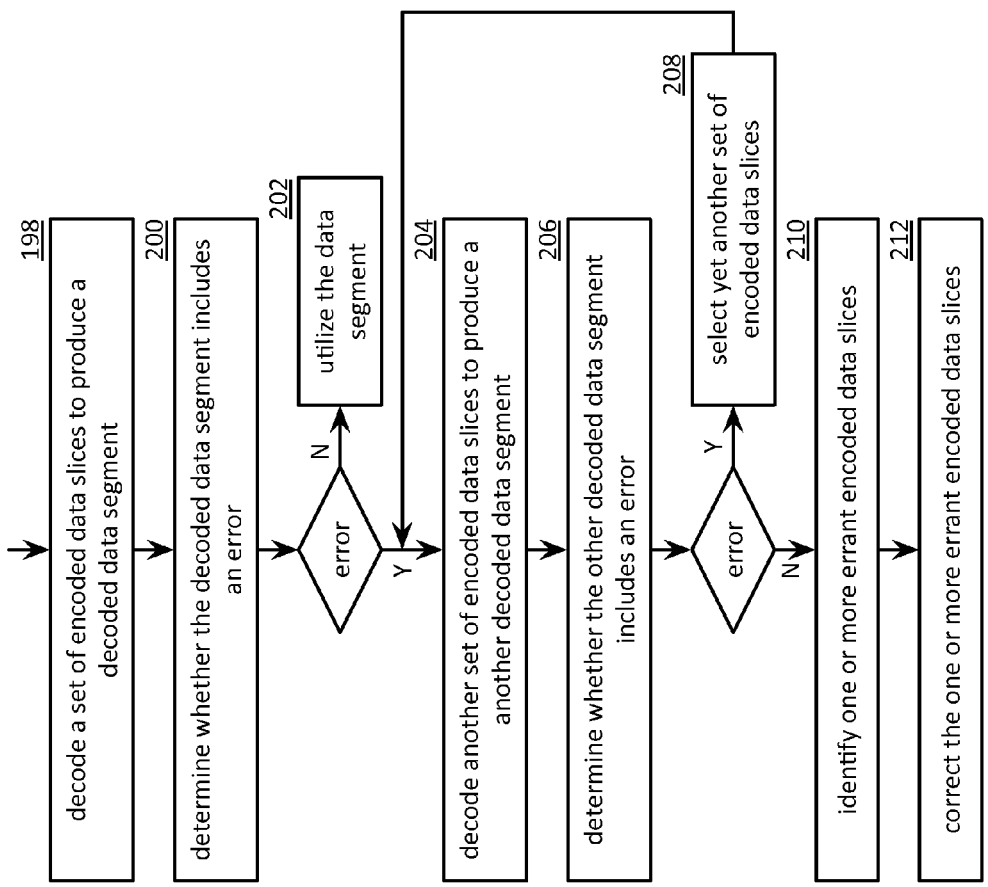

EFFICIENTLY ACCESSING AN ENCODED DATA SLICE UTILIZING A MEMORY BIN

CROSS REFERENCE TO RELATED PATENTS

The present U.S. Utility Patent Application claims priority pursuant to 35 U.S.C. §119(e) to U.S. Provisional Application Ser. No. 61/390,368, entitled "DATA MANIPULATION IN A DISPERSED STORAGE SYSTEM," filed Oct. 6, 2010, pending, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 6A is a flowchart illustrating an example of assigning a vault to a set of dispersed storage (DS) units in accordance with the invention;

FIG. 6B is a table illustrating an example of a vault assignment table in accordance with the invention;

FIG. 6C is a table illustrating another example of a vault assignment table in accordance with the invention;

FIG. 7A is a table illustrating an example of a slice location table in accordance with the invention;

FIG. 7B is a table illustrating an example of an open location table in accordance with the invention;

FIG. 7C is a file structure diagram illustrating an example of a file structure in accordance with the invention;

FIG. 7D is a file structure diagram illustrating another example of a file structure in accordance with the invention;

FIG. 8A is a flowchart illustrating an example of storing an encoded data slice in accordance with the invention;

FIG. 8B is a flowchart illustrating an example of retrieving an encoded data slice in accordance with the invention;

FIG. 9A is a schematic block diagram of another embodiment of a computing system in accordance with the invention;

FIG. 9B is a content portion set illustrating an example of content portions in accordance with the invention;

FIG. 11A is a schematic block diagram illustrating an operational example of an embodiment a dispersed storage processing unit in accordance with the invention;

FIG. 11B is a matrix diagram of an example coding matrix in accordance with the invention; and FIG. 12 is a flowchart illustrating an example of repairing an encoded data slice in accordance with the invention.

DETAILED DESCRIPTION OF THE INVENTION

Figure 1:
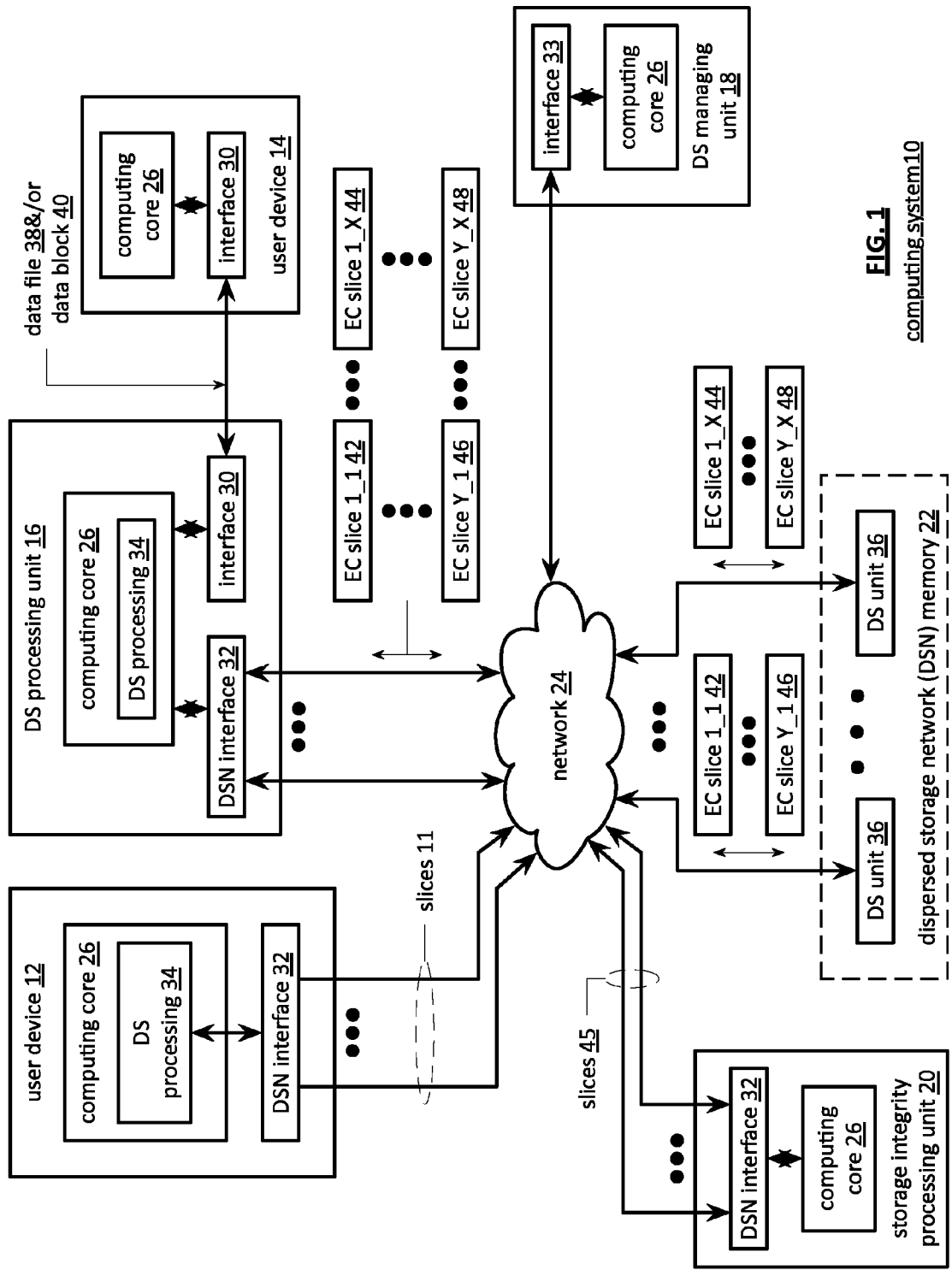
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-12.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-12.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
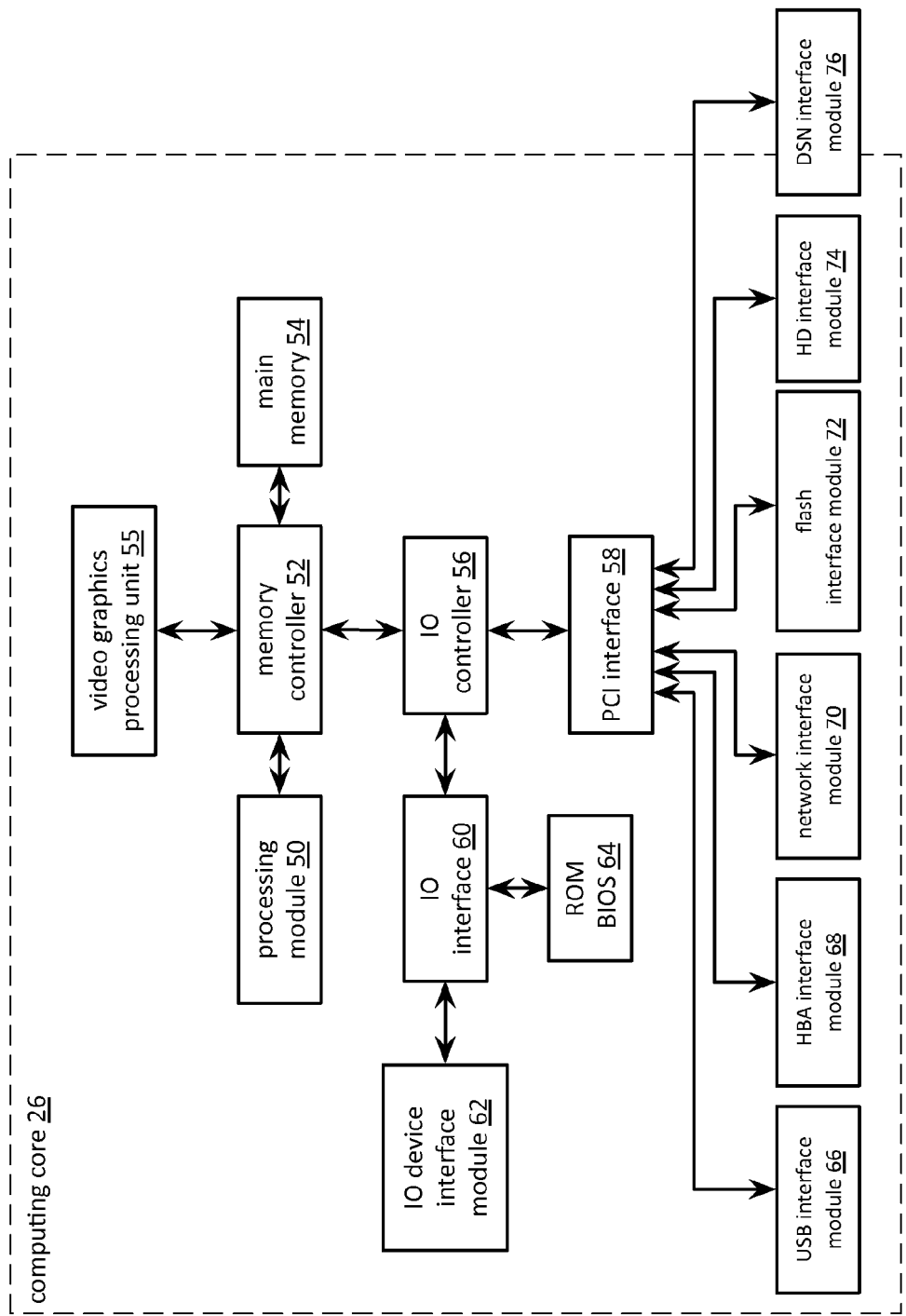
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/ or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-12.

Figure 3:
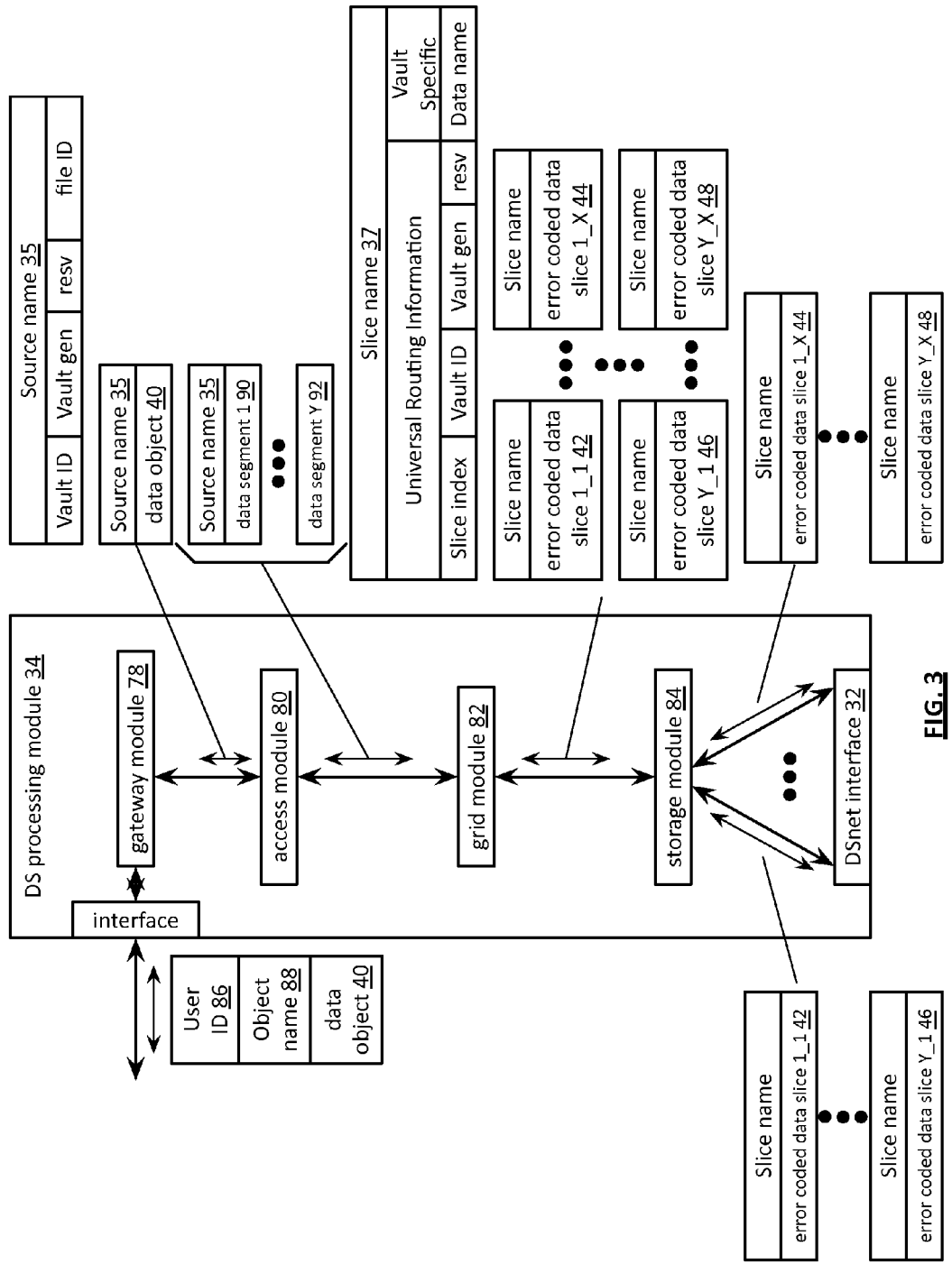
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
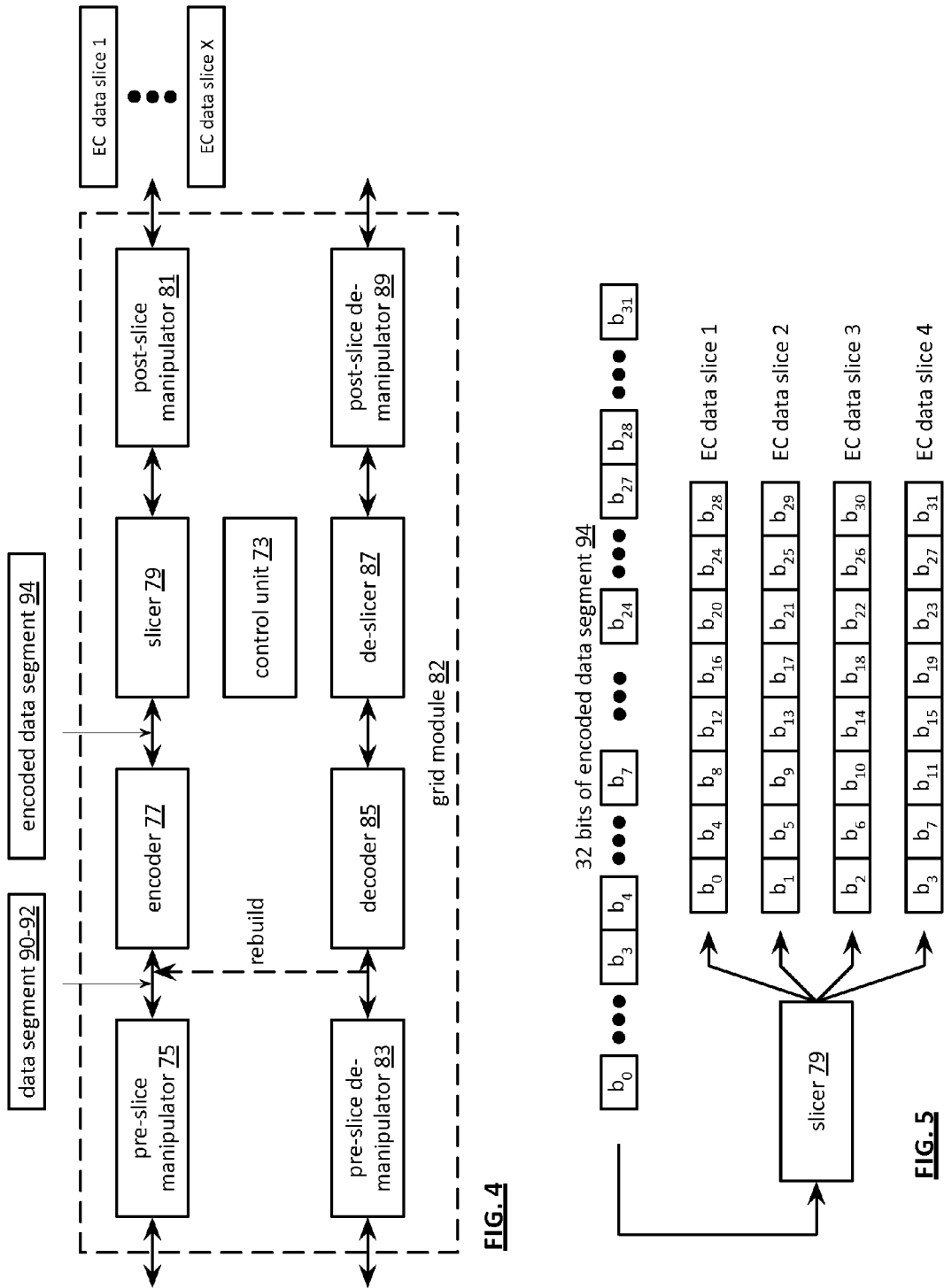
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6A is a flowchart illustrating an example of assigning a vault to a set of dispersed storage (DS) units. The method begins with step 102 where a processing module (e.g., of a DS managing unit) receives a new vault assignment request. For example, one or more new users of a dispersed storage network (DSN) are being added such that users may store and retrieve data in the DSN and are associated with the vault. The method continues at step 104 where the processing module determines vault requirements. The determination may be based on one more of the new vault assignment request, a vault type indicator, a command, a message, and a lookup. For example, the processing module determines that the vault requirements include a requirement that the vault shall not share any more than two DS units with any other vault. As another example, the processing module determines that the vault requirements include a requirement that the vault shall not share any DS units with vault 379. As yet another example, the processing module determines that the vault requirements include a requirement that the vault may share any number of DS units with any other vault. As a further example, the processing module determines that the vault requirements include a requirement that the vault shall not share any DS units with any other vault (e.g., exclusivity of the DS units).

The method continues at step 106 where the processing module determines candidate DS units. The determination may be based on one or more of an available DS unit list, a query, a DS unit utilization indicator, an error message history, a lookup, a predetermination, a message, and a command. The method continues at step 108 where the processing module obtains assignments (e.g., which DS units are assigned to which vaults) of the candidate DS units based on one or more of a vault assignment table, a query, a message, and a lookup.

The method continues at step 110 where the processing module determines DS unit assignments for the new vault. The determination may be based on one or more of the vault requirements, the candidate DS units, the assignments of the candidate DS units (e.g. as provided in a vault assignment table), requirements of other vaults assigned to the candidate DS units, an assignment policy, a message, and a command. Such an assignment policy may include similar restrictions as discussed with respect to the vault requirements. For example, the processing module assigns DS units 3, 4, 5, 6, to vault 3 when vault 3 requires that no more than two DS units are shared with any other vault, candidate DS units 3-6 are currently assigned to at most one other vault (e.g., vault 1 or vault 2), and the other vaults assigned to DS units 3-6 have vault requirements such that assigning vault 3 to the same DS units 3-6 is allowed. The method continues at step 112 where the processing module updates a virtual DSN address to physical location table. For example, the processing module updates the table to indicate that slice names associated with vault 3 are assigned to a DS unit storage set that includes DS units 3-6. Alternatively, or in addition to, the processing module updates the vault assignment table to indicate that vault 3 is assigned to DS units 3-6. Example vault assignment tables are illustrated in FIGS. 6B and 6C.

FIG. 6B is a table illustrating an example of a vault assignment table 114. The vault assignment table 114 includes a vault identifier (ID) field 116 and a dispersed storage (DS) units field 118. The DS units field 118 includes one or more entries of DS unit identifiers (IDs) associated with a corresponding vault ID entry of the vault ID field 116. For example, vault ID 1 is assigned to DS units 1-4, vault ID 2 is assigned to DS units 1, 2, 5, 6, and vault ID 3 is unassigned.

FIG. 6C is a table illustrating another example of a vault assignment table 120. The vault assignment table 120 includes a vault identifier (ID) field 122 and a dispersed storage (DS) units field 124. For example, vault ID 1 is assigned to DS units 1-4, vault ID 2 is assigned to DS units 1, 2, 5, 6, and vault ID 3 is assigned to DS units 3-6 when a restriction exists such that a DS unit may not be assigned to more than two vaults.

FIG. 7A is a table illustrating an example of a slice location table 126. The slice location table 126 includes a slice name field 128, a file identifier (ID) field 130, and a file offset field 132. The slice name field 128 includes at least one slice name entry of an encoded data slice that is stored in a memory (e.g., of a dispersed storage (DS) unit). The file ID field 130 includes at least one file name or memory container identifier entry where the encoded data slice is stored. Memory containers are structured to accommodate a specific maximum number of bytes per encoded data slice. For example, file 400 (e.g., memory container 400) refers to a file where a maximum number of bytes per encoded data slice is 400 bytes. As another example, file 200 refers to a file (e.g., memory container) where the maximum number of bytes per encoded data slice is 200 bytes. The file ID field 130 may refer to any number of files that are utilized to store encoded data slices. Note that a data storage efficiency may be provided to a system utilizing such a file structure since data spaces are established that are very close to the length in bytes of the encoded data slices to be stored. For example, a file 50 refers to a file or the maximum number of bytes per encoded data slices 50 bytes, a file 100 is utilized to store encoded data slices up to 100 bytes in length, a file 150 is utilized, a file 200 is utilized, a file 250 is utilized, a file 300 is utilized, etc.

The file offset field 132 includes an offset entry from a first storage block of the file (e.g. memory container) to a storage block (e.g., memory bin) where the encoded data slice is stored or a memory bin identifier entry within the memory container. For example, an encoded data slice associated with slice name 1AB is stored in a fourth storage block (e.g., memory bin) after a first storage block of a file with a file ID of 400. As another example, an encoded data slice associated with slice name BC8 is stored in a first storage block (e.g., memory bin) after a first storage block of a file (e.g. a memory container), with a file ID of 200. The slice location table 126 may be subsequently utilized to identify where to retrieve a stored encoded data slice. Such a method of retrieval operation is discussed in greater detail with reference to FIG. 8B.

FIG. 7B is a table illustrating an example of an open location table 134. The open location table 134 includes a file identifier (ID) field 136 and a file offset field 138. The file offset field 138 includes entries of file offsets (e.g., memory bin identifiers) that are available within a corresponding entry of the file ID field 136. For example, a memory bin at file offset zero of file ID 200 indicates an open data and entries for a memory container of file ID 400 indicate open data blocks (e.g., memory bins) at file offsets 0, 1, and 3. The open location table may be utilized to identify where to store a encoded data slice for storage. Such a method of operation is discussed in greater detail with reference to FIG. 8A.

FIG. 7C is a file structure diagram illustrating an example of a file structure 140 (e.g., memory container structure). The file structure is arranged in a plurality of data blocks (e.g., memory bins) wherein each data block is a same size. For example, file 200 includes a plurality of data blocks where each data block is 200 bytes. An offset number (e.g., memory bin identifier) refers to a number of data blocks after a first data block of the memory container structure. The offset number may be utilized to index to a particular data block. Note that a system level performance improvement may be provided with such an offset structure. Available open data blocks are utilized to store encoded data slices. For example, a data block of file 200 at offset 0 is open and available to store an encoded data slice.

The plurality of data blocks may be utilized to store encoded data slices such that a number of bytes of an encoded data slice is no greater than a data block size. For example, an encoded data slice with a number of bytes equal to 200 may be stored in a data block of the file 200 where data blocks are 200 bytes. For instance, an encoded data slice with a slice name of BC8 is stored in a data block of file 200 at offset 1. In this instance, the encoded data slice fills out the entire data block. As another example, the encoded data slice may not fill out the entire data block. As illustrated, an encoded data slice with a slice name of 457 is stored in a data block of file 200 at offset 2. Note that slice 457 is less than 200 bytes such that open space is not utilized in a portion of the corresponding data block (e.g., memory bin).

FIG. 7D is a file structure diagram illustrating another example of a file structure 142 (e.g., a memory container). The file structure is arranged in a plurality of data blocks (e.g., memory bins) wherein each data block is the same size. For example, file 400 includes a plurality of data blocks where each data block is 400 bytes. An offset number refers to a number of data blocks after a first data block. For example, each data block (e.g., memory bin) at offsets 0, 1, and 3 of file 400 are open and available to store an encoded data slice. The plurality of data blocks may be utilized to store encoded data slices such that a number of bytes of an encoded data slice is no greater than a data block size. For example, an encoded data slice with a number of bytes equal to 400 may be stored in a data block of the file 400 where data blocks are 400 bytes. For instance, an encoded data slice with a slice name of 1AB is stored in a data block of file 400 at offset 4. In this instance, the encoded data slice fills out the entire data block. As another example, the encoded data slice may not fill out the entire data block. Each of encoded data slices with a slice names of 436 (stored at offset 2) and C90 (stored at offset 5) are stored in a data block of file 400 where not all of the data block is utilized leaving a portion of the data block open. A method to select a data block and store an encoded data slice in the data block is discussed in greater detail with reference to FIG. 8A.

FIG. 8A is a flowchart illustrating an example of storing an encoded data slice. The method begins with step 144 where a processing module (e.g., a dispersed storage (DS) unit) receives a store slice message that includes an encoded data slice to store. The store slice message may also include one or more of a slice name, a slice length indicator, a data identifier (ID), a source name, an integrity check number, a transaction identifier, a request number, a payload length, a slice revision, and an expected slice revision. The method continues at step 146 where the processing module determines a slice length of the encoded data slice. The determining the slice length of the encoded data slice includes at least one of extracting the slice length from a store encoded data slice request, sending a query to a requesting entity and receiving the slice length in response to the query, and counting a number of bytes of the encoded data slice to produce the slice length.

The method continues at step 148 where the processing module compares the slice length to a plurality of bin widths, wherein each of the plurality of bin widths represents a fixed storage width of a plurality of memory bins within each of a plurality of memory containers, wherein a storage unit (e.g., the DS unit) includes the plurality of memory containers. The comparing includes identifying one or more memory containers of the plurality of memory containers having a fixed storage width equal to or greater than the slice length and identifying the selected memory container from the one or more memory containers. For example, the processing module identifies memory containers 400-1, 400-2, and 400-3 when the slice length is 350 bytes.

The method continues at step 150 where the processing module selects one of the plurality of memory containers based on the comparing to produce a selected memory container. The identifying the selected memory container is based on at least one of a round robin process, memory availability of the one or more memory containers, a memory reliability level associated with the one or more memory containers, a random process, and memory utilization efficiency. For example, the processing module selects memory container 400-2 as the selected memory container when memory container 400-2 has more available memory than memory containers 400-1 and 400-3.

The method continues at step 152 where the processing module identifies an available bin of the plurality of bins of the selected memory container. The identifying the available bin includes at least one of identifying a first available bin of the selected memory container, identifying a last available bin of the selected memory container, identifying the available bin from a plurality of available bins of the selected memory container using a random selection process, and updating a list of the plurality of available bins by removing the available bin. For example, the processing module accesses an open memory bin table to identify the available bin. As another example, the processing module updates the list of the plurality of available bins by removing the available bin from the list to signify that the bin has been assigned.

The method continues at step 154 where the processing module stores the encoded data slice in the available bin. For example, the processing module retrieves the memory container associated with the available bin, inserts the encoded data slice in the available bin to produce an updated memory container, and stores the updated memory container in a memory of the DS unit. As another example, the processing module writes the encoded data slice into the available bin of the memory container. The method continues at step 156 where the processing module updates a slice location table to record the storing of the encoded data slice in the available bin. The method continues at step 158 where the processing module sends a storage confirmation message (e.g., to a requesting entity) after storing of the encoded data slice in the available bin.

The processing module may track history of received encoded data slices and corresponding slice lengths to enable determination of when to add a new memory container (e.g., storage file) and what size memory bins (e.g., storage blocks) to establish. For example, the processing module determines to add a memory container with a memory bin size of 450 bytes when the history indicates that 80% of received encoded data slices are between 425 and 450 bytes in length and a closest sized data file accommodates data blocks of 500 bytes. Note that a storage efficiency improvement may be provided to the system by utilizing such a step.

FIG. 8B is a flowchart illustrating an example of retrieving an encoded data slice. The method begins with step 160 where a processing module (e.g., of a dispersed storage (DS) unit) receives a retrieve encoded data slice request that includes a slice name. The method continues at step 162 where the processing module performs a memory identifying process to identify a memory container of a plurality of memory containers that is storing an encoded data slice corresponding to the slice name to produce an identified memory container, wherein a storage unit includes the plurality of memory containers and wherein each of the plurality of memory containers includes a plurality of bins of a fixed storage width and identify a bin of a plurality of bins of the identified memory container to produce an identified bin. The performing the memory identifying process includes at least one of performing a memory table look up, performing a memory container table look up and a bin table look up, and performing a memory identifying function based on the retrieve encoded data slice request.

The method continues at step 164 processing module retrieves content of the identified bin. For example, the processing module retrieves a first 10 bytes of the identified bin such that a slice length indicator is included in the first 10 bytes. As another example, the processing module retrieves a bin width number of bytes (e.g., all bytes) of the identified bin. The method continues at step 166 where the processing module determines a length of the encoded data slice based on the content. The determining the length of the encoded data slice includes at least one of extracting the length from the retrieve encoded data slice request, sending a query to a requesting entity and receiving the length in a response to the query, and extracting the length from the content.

The method continues at step 168 where the processing module prepares a response that includes a portion of the identified bin that stores the encoded data slice and omits a remaining portion (e.g., unused portion) of the identified bin when the length is less than the fixed storage width of the identified bin. For example, the processing module prepares the response to include an encoded data slice of 398 bytes in length when a bin width of the identified bin is 400 bytes. The method continues at step 170 where the processing module sends the response to a requesting entity.

FIG. 9A is a schematic block diagram of another embodiment of a computing system. The system includes a broadcast source 172, a plurality of user devices 1-U, a dispersed storage (DS) processing unit 16, and a dispersed storage network (DSN) memory 22. The broadcast source 172 outputs the content 173 to the plurality of user devices 1-U. The content 173 may include one or more of video broadcast, audio broadcasts, multimedia broadcast, multimedia files, video files, audio files, user files, text files, and streaming data. As an example, the broadcast source 172 outputs content 173 that includes a live television (TV) broadcast of a TV program.

Each of the plurality of user devices 1-U captures at least a portion of the content 173 and sends a corresponding portion of the content 173 to the DS processing unit 16 for storage in the DSN memory 22. Each of the plurality of user devices 1-U may capture all of the content 173 or may capture at least one portion of a plurality of portions 1-U of the content 173. For example, user device 1 captures and sends an initial portion of content 173 as content portion 1, user device 2 captures and sends a subsequent portion of the content 173 as content portion 2 (e.g., missing the very beginning of the content), user device 3 captures and sends an early portion of the content but not a later portion as content portion 3, user device 4 captures and sends a middle portion as content portion 4 (e.g., missing the very beginning and the very end of the content), and user device 5 captures and sends at least two portions of the content while missing a gap between the at least two portions as content portions 5*i* and 5*ii*. Such an example is illustrated in FIG. 9B.

The DS processing unit 16 dispersed storage error encodes the content portions 1-U to produce encoded data slices and sends the encoded data slices to the DSN memory 22 for storage therein. For example, the DS processing unit 16 dispersed storage error encodes and stores each of the content portions 1-U. As another example, the DS processing unit 16 dispersed storage error encodes and stores a content portion that is different (e.g., new) than all other content portions received thus far. As yet another example, the DS processing unit 16 dispersed storage error encodes and stores only subsections of each of the content portions 1-U that are different (e.g., new) than all other subsections of other content portions received thus far.

The DS processing unit 16 determines if at least a subsection of a received content portion is different based on determining an aligned segmentation of each of the received content portions based on comparing a newly received segment to segments that have already been stored as slices in the DSN memory 22. Such a method is discussed in greater detail with reference to FIG. 10.

FIG. 9B is a content portion set illustrating an example of content portions. As illustrated, a reference content A45 begins at a start timestamp of ts and finishes at an end timestamp of tf. As illustrated, a user device 1 captures the entire content A45 such that content A45 portion 1 begins at a timestamp of t1*a* (e.g., same as ts) and ends at a timestamp of t1*b* (e.g., same as tf). In this instance, user device 1 captures the entire content A45. As illustrated, user device 2 captures a later portion of content A45 such that content A45 portion 2 begins at a timestamp of t2*a* (e.g., after ts) and ends at a timestamp of t2*b* (e.g., same as tf). As illustrated, user device 3 captures an early portion of content A45 such that content A45 portion 3 begins at a timestamp of t3*a* (e.g., same as ts) and ends at a timestamp of t3*b* (e.g., before tf). As illustrated, user device 4 captures a middle portion of content A45 such that content A45 portion 4 begins at a timestamp of t4*a* (e.g., after ts) and ends at a timestamp of t4*b* (e.g., before tf). As illustrated, user device 5 captures an early middle portion of content A45 such that content A45 portion 5*i* begins at a timestamp of t5*ia* (e.g., after ts) and ends at a timestamp of t5*ib* (e.g., before tf). As illustrated, user device 5 captures a later portion of content A45 such that content A45 portion 5*ii* begins at a timestamp of t5*iia* (e.g., after ts) and ends at a timestamp of t5*iib* (e.g., same as tf).

Figure 10:
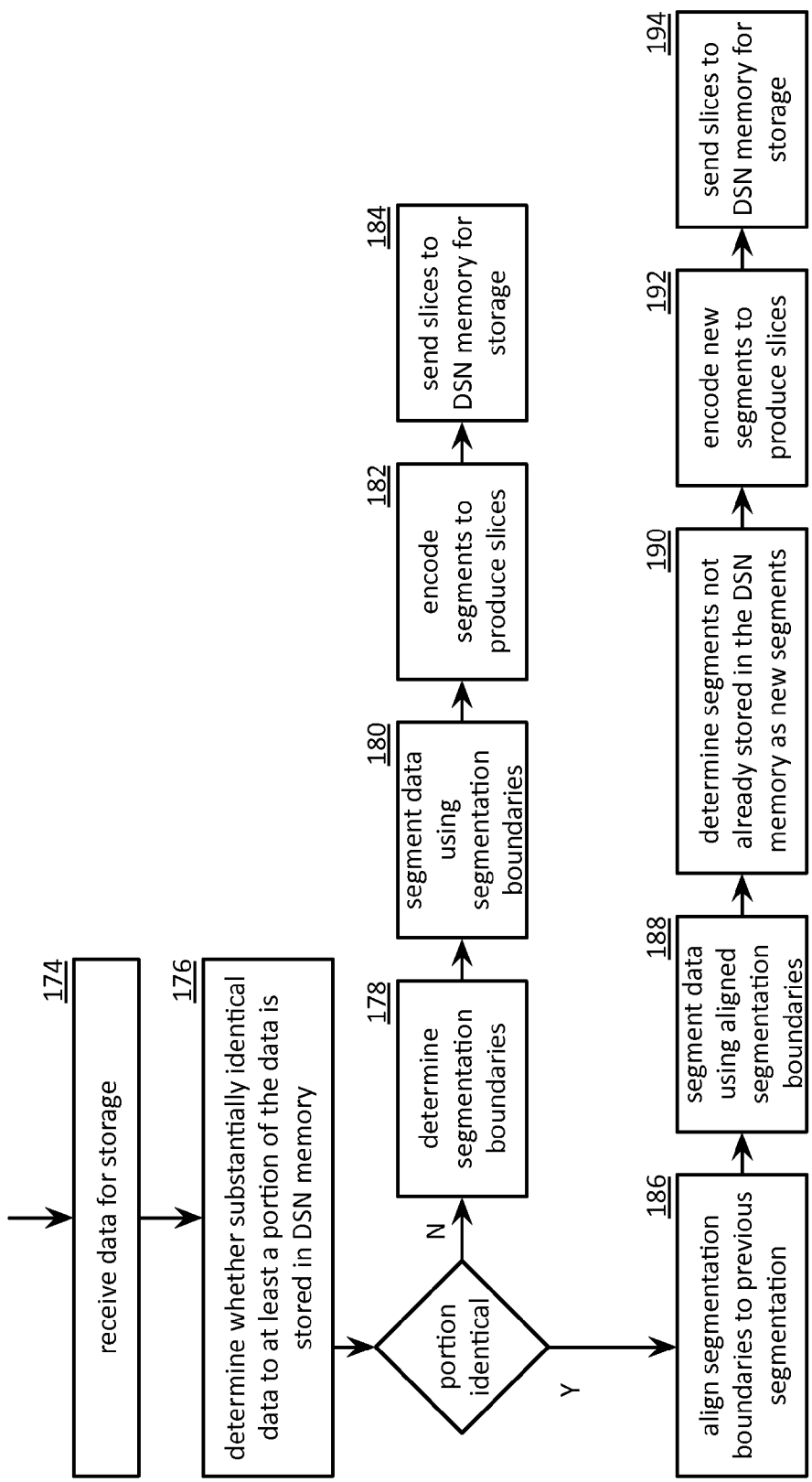
FIG. 10 is a flowchart illustrating an example of storing data in accordance with the invention.

FIG. 10 is a flowchart illustrating an example of storing data. The method begins with step 174 where a processing module (e.g., of a dispersed storage (DS) processing unit) receives data (e.g., content as discussed with reference to FIGS. 9A-9B) for storage. The method continues at step 176 where the processing module determines whether substantially identical data to at least a portion of the data is stored in a dispersed storage network (DSN) memory. The determination is based on one or more of comparing a portion of the data to stored data, comparing a hash of a portion of the data to a hash of a portion of stored data, choosing a segmentation boundary of the data, and comparing a segment of the data to a stored segment. For example, the processing module determines a segmentation boundary based on a peak output of a sliding window hash. The method branches to step 186 when the processing module determines that substantially identical data to at least the portion of the data is stored in the DSN memory. The method continues to the next step when the processing module determines that substantially identical data to at least the portion of the data is not stored in the DSN memory.

The method continues at step 178 where the processing module determines segmentation boundaries based on one or more of selecting a first boundary and determining a segment size. The processing module may select the first boundary based on one or more of an arbitrary selection, starting at the beginning of the received data, starting at an offset from the beginning of the received data, utilizing a sliding window hash function to detect a peak (e.g., highest value) in a hash function output, utilizing the sliding window hash function to detect a predetermined value in the hash function output, utilizing the sliding window hash function to detect a low value in the hash function output, a lookup, a predetermination, and a command. The processing module may determine a segment size based on one or more of the data, a first segment boundary selection, a lookup, a requester identifier associated with a storage request, and a command. The processing module determines subsequent segment boundaries based on the selected first boundary and the segment size. For example, the processing module determines segment boundaries to occur at segment size intervals starting at the first boundary in both a forward and reverse direction (e.g. since the first boundary may be in the middle of the portion of data).

The method continues at step 180 where the processing module segments the data utilizing the segmentation boundaries to produce one or more segments. The method continues at step 182 where the processing module dispersed storage error encodes the one or more segments to produce one or more sets of encoded data slices. The method continues at step 184 where the processing module sends the one or more sets of encoded data slices to the DSN memory for storage therein.

The method continues at step 186 where the processing module aligns segmentation boundaries to previous segmentation when the processing module determines that substantially identical data to at least a portion of the data is stored in the DSN memory. Such an alignment may be based on the processing module selecting a first boundary and determining a segment size. The processing module may select the first boundary based on one or more of a lookup in a boundary table corresponding to the data, starting at the beginning of the received data, starting at an offset from the beginning of the received data, utilizing a sliding window hash function to detect a peak (e.g., highest value) in a hash function output, utilizing the sliding window hash function to detect a predetermined value in the hash function output, utilizing the sliding window hash function to detect a low value in the hash function output, a lookup, a predetermination, and a command. The processing module may determine a segment size based on one or more of a lookup in a segment size table corresponding to the data the data, a previous segment boundary selection, a lookup, a requester identifier associated with a storage request, a command. The processing module determines subsequent segment boundaries based on the selected first boundary and the segment size. For, the processing module determines segment boundaries to occur at segment size intervals starting at the first boundary in both a forward and reverse direction (e.g. since the first boundary may be in the middle of the portion of data).

The method continues with step 188 where the processing module segments the data utilizing the aligned segmentation boundaries to produce one or more new segments. The method continues at step 190 where the processing module determines segments not already stored in the DSN memory as new segments based on one or more of comparing the segments to segment stored in the DSN, comparing a hash function output of a data segment to a hash function output of a store data segment, a lookup, a command. The method continues at step 192 where the processing module dispersed storage error encodes the one or more new segments to produce one or more sets of new encoded data slices. The method continues at step 194 where the processing module sends the one or more sets of new encoded data slices to the DSN memory for storage therein. In addition, the processing module may store segment numbers and/or timestamps associated with the data segments in the DSN memory to enable subsequent retrieval of the data.

FIG. 11A is a schematic block diagram illustrating an operational example of an embodiment a dispersed storage (DS) processing unit. The DS processing unit includes a gateway module 78, an access module 80, a grid module 82, and a storage module 84. In an example of operation, the gateway module 78 communicates a data object of 1,000,000 bytes in size with the access module 80. The access module 80 communicates the data object in a format of data segments 1-100k with the grid module 82, wherein each data segment of data segments 1-100k is 10 bytes. Note that 100,000 ten byte data segments equals 1,000,000 bytes. The grid module 82 communicates the data object in a format of slices 1-16 with the storage module 84, wherein each slice of the slices 1-16 are 100,000 bytes each. The grid module 82 utilizes a dispersed storage error coding function to encode each data segment of data segments 1-100k producing the slices 1-16 when a pillar with is 16 and a decode threshold is 10. As such, 16 100,000 byte slices equals 1,600,000 bytes. Alternatively, the grid module 82 encodes each data segment to produce 16 one byte slices for a total of 1,600,000 one byte slices. Content of the slices is further discussed with reference to FIG. 11B.

FIG. 11B is a matrix diagram of an example coding matrix. The matrix includes 100,000 columns, wherein each column include 16 bytes corresponding to a data segment of data segments 1-100k, and 16 rows that include slices 1-16. The 16 bytes of each column includes 10 bytes of a corresponding data segment and 6 parity bytes when a pillar with is 16, a decode threshold is 10, and an encoding matrix is utilized wherein the encoding matrix includes a unity matrix corresponding to the first 10 bytes. In an example of a storage operation, a processing module of a dispersed storage (DS) processing unit dispersed storage error encodes a 1,000,000 byte data object to produce slices 1-16. The processing module temporarily stores slices 1-16 in the matrix. Bytes 1-10 of columns of the matrix are equivalent to a corresponding data segment bytes 1-10 and bytes 11-16 of the columns of the matrix are equivalent to a corresponding set of parity bytes 1-6. As illustrated, bytes 1-10 of column 1 are equivalent to bytes 1-10 of data segment 1 (e.g., s1 b1-s1 b10) and bytes 11-16 of column 1 are equivalent to data segment 1 parity bytes 1-6 (e.g., s1 p1-s1 p6). Note that the pattern continues through column 100k. Next, the processing module retrieves slices 1-16 from the matrix and sends the slices 1-16 to a dispersed storage network (DSN) memory for storage.

In example of retrieval operation, the processing module receives at least some of the slices 1-16 from the DSN memory and temporarily stores the at least some of the slices 1-16 in a similar matrix. The processing module receives a plurality of data segment integrity values. The processing module utilizes a Reed Solomon error coding dispersal storage function utilizing the pillar width of 16 and the decode threshold of 10 to decode a data segment from each of the 100,000 columns of the matrix. The processing module can decode a valid data segment when there are as many as (W-T-1)/2 error bytes (W=pillar width, T=threshold) when the processing module utilizes Reed Solomon based dispersed storage error decoding. For instance, the processing module decodes the valid data segment when there are as many as 3 error bytes when a pillar width is 16 and a decode threshold is 10. The processing module can decode a valid data segment when there are as many as W-T erasures (e.g., missing and/or deleted bytes) when the processing module utilizes Reed Solomon based dispersed storage error decoding. For instance, the processing module can decode the valid data segment when there are as many as 6 missing bytes when the pillar width is 16 and the decode threshold is 10. Note that the processing module can decode a valid data segment by erasing the error bytes when there are between 4 and 6 error bytes. Alternatively, the processing module produces the valid data segment by identifying a combination of a decode threshold number bytes that produces a valid data segment and correcting any error bytes by identifying each error byte and producing corrected bytes to replace each error byte.

In the retrieval example continued, the processing module determines a calculated integrity value based on data segment 1 (e.g., calculating a hash of data segment 1). The processing module compares the calculated integrity value to a corresponding data segment integrity value received from the DSN memory. The processing module determines that the data segment is valid when the comparison indicates that the calculated integrity value substantially equals the corresponding data segment integrity value received from the DSN. The processing module utilizes the decoded data segment when the processing module determines that the data segment is valid. The processing module repairs the data segment when the processing module determines that the data segment is not valid. The processing module repeats the above method to validate and/or repair each of the data segments 1-100,000. The processing module aggregates the 100,000 data segments to reproduce the 1,000,000 byte data object. The method to repair an encoded data slice is discussed in greater detail with reference to FIG. 12.

FIG. 12 is a flowchart illustrating an example of repairing an encoded data slice. The method begins with step 198 where a processing module (e.g., of dispersed storage (DS) processing module) decodes, using a dispersed storage error coding function, a set of encoded data slices to produce a decoded data segment, wherein the set includes a combination of at least a decode threshold number of the encoded data slices.

The method continues at step 200 where the processing module determines whether the decoded data segment includes an error. The determining whether the decoded data segment or another decoded data segment includes the error includes at least one of comparing an integrity value of the decoded data segment or the other decoded data segment with a stored integrity value, indicating that the decoded data segment or the other decoded data segment does not include the error when the integrity value compares favorably to the stored integrity value, and indicating that the decoded data segment or the other decoded data segment includes the error when the integrity value compares unfavorably to the stored integrity value. The processing module determines the integrity value of the decoded data segment or the other decoded data segment utilizing one or more integrity check mechanisms including a deterministic algorithm, a stored data manipulation method, a received data manipulation method, a compression scheme, a checksum scheme, a signature function, a hashing function, and an encryption method. For example, the processing module compares a hash digest, produced utilizing a hashing function on the decoded data segment, to a stored hash digest corresponding to the data segment and indicates that the decoded data segment includes the error when the comparison is unfavorable (e.g., substantially not the same).

The method branches to step 204 when the processing module determines that the decoded data segment includes the error. The method continues to step 202 when the processing module determines that the decoded data segment does not include the error. The method continues at step 202 where the processing module utilizes the data segment when the data segment does not include an error. For example, the processing module aggregates the data segment with other data segments to reproduce data.

The method continues at step 204 where the processing module decodes, using the dispersed storage error coding function, another set of encoded data slices to produce another decoded data segment, wherein the another set includes another combination of the at least a decode threshold number of the encoded data slices. The decoding the other set of encoded data slices includes selecting the other set of encoded data slices based on a preceding set of encoded data slices and an incremental difference function (e.g., excluding one slice at a time). For example, the processing module excludes one slice from the preceding set of encoded data slices and adds a different slice producing the at least the decode threshold number of encoded data slices.

The method continues at step 206 where the processing module determines whether the other decoded data segment includes the error. The method branches to step 210 when the processing module determines that the other decoded data segment does not include the error. The method continues to step 208 when the processing module determines that the other decoded data segment includes the error. The method continues at step 208 where the processing module selects yet another set of encoded data slices based on a preceding set of encoded data slices and the incremental difference function. For example, the processing module selects the another set of encoded data slices to progressively exclude more slices from the overall test sequence by initially assuming that there is only one slice error within the data segment and moving to an assumption of two slice errors etc. The method loops back to step 204 where the processing module repeats, for the yet another set of encoded data slices, the decoding step, the determining step, and the identifying and correcting step or the repeating steps when the other decoded data segment includes the error.

The method continues at step 210 where the processing module identifies the one or more errant encoded data slices based on a difference between the set of encoded data slices and the another set of encoded data slices when the other decoded data segment does not include the error. The identifying the one or more errant encoded data slices includes identifying an encoded data slice that was included in the set of encoded data slices and was excluded from the another set of encoded data slices to produce an identified errant encoded data slice.

For example, there are 16 choose 1=16 possible encoded data slices that are in error when a pillar width is 16 and an assumption is made that only one encoded data slice is in error. Six encoded data slices are excluded from each selection of a decode threshold number of encoded data slices so there are at most a ceiling of (16/6)=3 decode attempts at the most before isolating the one encoded data slice in error when the decode threshold number is 10. If no decoding attempts result in a valid decoding, the processing module assumes that two encoded data slices are in error. There are 16 choose 2=120 possible combinations of two encoded data slices in error and each decode attempt tests 3 combinations since 6 encoded data slices are excluded. As such, a maximum of 40 decode attempts detects the combination of two encoded data slices in error. An efficiency improvement is provided to start by assuming a fewest number of errant encoded data slices since a number of required decode combinations increases greatly with a number of encoded data slices in error.

The method continues at step 212 where the processing module corrects the one or more errant encoded data slices. The correcting the one or more errant encoded data slices includes dispersed storage error encoding the other decoded data segment that does not include the error to produce a plurality of encoded data slices, selecting corresponding ones of the plurality of encoded data slices to replace the one or more errant encoded data slices to produce one or more selected encoded data slices, and facilitating overwriting, in a dispersed storage network, the one or more errant encoded data slices with the one or more selected encoded data slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module of storage unit of a dispersed storage network, the method comprises:
   receiving an encoded data slice to store;
   determining a slice length of the encoded data slice;
   comparing the slice length of the encoded data slices to a plurality of fixed storage widths, wherein physical memory of the storage unit is divided into a plurality of memory containers, wherein each of the plurality of memory containers includes a plurality of memory bins, and wherein each of the plurality of memory bins of one of the plurality of memory containers has one of the plurality of fixed storage widths such that, from memory container to memory container, the storage widths of the plurality of memory bins have differing ones of the plurality of fixed storage widths;
   selecting one of the plurality of memory containers based on the comparing to produce a selected memory container;
   identifying an available bin of the plurality of bins of the selected memory container; and
   storing the encoded data slice in the available bin.

2. The method of claim 1 further comprises:
   updating a slice location table to record the storing of the encoded data slice in the available bin.

3. The method of claim 1 further comprises:
   sending a storage confirmation message after storing of the encoded data slice in the available bin.

4. The method of claim 1, wherein the determining the slice length of the encoded data slice comprises at least one of:
   extracting the slice length from a store encoded data slice request;
   sending a query to a requesting entity and receiving the slice length in response to the query; and
   counting a number of bytes of the encoded data slice to produce the slice length.

5. The method of claim 1, wherein the comparing comprises:
   identifying one or more memory containers of the plurality of memory containers having a fixed storage width equal to or greater than the slice length; and
   identifying the selected memory container from the one or more memory containers.

6. The method of claim 5, wherein the identifying the selected memory container is based on at least one of:
   a round robin process;
   memory availability of the one or more memory containers;
   a random process; and
   memory utilization efficiency.

7. The method of claim 1, wherein the identifying the available bin comprises at least one of:
   identifying a first available bin of the selected memory container;
   identifying a last available bin of the selected memory container;
   identifying the available bin from a plurality of available bins of the selected memory container using a random selection process; and
   updating a list of the plurality of available bins by removing the available bin.

8. A storage unit of a dispersed storage network, wherein the storage unit comprises:
   an interface;
   physical memory that is divided into a plurality of memory containers, wherein each of the plurality of memory containers includes a plurality of memory bins, and wherein each of the plurality of memory bins of one of the plurality of memory containers has one of a plurality of fixed storage widths such that, from memory container to memory container, the storage widths of the plurality of memory bins have differing ones of the plurality of fixed storage widths; and
   a processing module operable to:
      receive, via the interface, an encoded data slice to store;
      determine a slice length of the encoded data slice;
      compare the slice length of the encoded data slices to a plurality of fixed storage widths;
      select one of the plurality of memory containers based on the comparing to produce a selected memory container;
      identify an available bin of the plurality of bins of the selected memory container; and
      store the encoded data slice in the available bin.

9. The storage unit of claim 8, wherein the processing module further functions to:
   update a slice location table to record the storing of the encoded data slice in the available bin.

10. The storage unit of claim 8, wherein the processing module further functions to:
    send, via the interface, a storage confirmation message after storing of the encoded data slice in the available bin.

11. The storage unit of claim 8, wherein the processing module functions to determine the slice length of the encoded data slice by at least one of:
    extracting the slice length from a store encoded data slice request;
    sending, via the interface, a query to a requesting entity and receiving, via the interface, the slice length in response to the query; and
    counting a number of bytes of the encoded data slice to produce the slice length.

12. The storage unit of claim 8, wherein the processing module functions to compare by:
    identifying one or more memory containers of the plurality of memory containers having a fixed storage width equal to or greater than the slice length; and
    identifying the selected memory container from the one or more memory containers.

13. The storage unit of claim 12, wherein the processing module functions to identify the selected memory container based on at least one of:
    a round robin process;
    memory availability of the one or more memory containers;
    a random process; and
    memory utilization efficiency.

14. The storage unit of claim 8, wherein the processing module functions to identify the available bin by at least one of:
    identifying a first available bin of the selected memory container;
    identifying a last available bin of the selected memory container;
    identifying the available bin from a plurality of available bins of the selected memory container using a random selection process; and
    updating a list of the plurality of available bins by removing the available bin.

* * * * *